(12) United States Patent
Joergensen

(10) Patent No.: US 6,349,631 B2
(45) Date of Patent: Feb. 26, 2002

(54) GASKET FOR A FUNNEL FOR A COFFEE MAKING APPARATUS

(75) Inventor: Carsten Joergensen, St. Niklausen (CH)

(73) Assignee: PI-Design AG, Triengen (CH)

( * ) Notice: Subject to any disclaimer, the term of this patent is extended or adjusted under 35 U.S.C. 154(b) by 0 days.

(21) Appl. No.: 09/739,036

(22) Filed: Dec. 15, 2000

(30) Foreign Application Priority Data

Dec. 16, 1999 (DK) ............................................ 01802/99

(51) Int. Cl.[7] ................................................. A47J 31/00
(52) U.S. Cl. ............................ 99/313; 99/310; 99/308; 277/608; 277/616
(58) Field of Search ....................... 99/313, 314, 310, 99/311, 309, 308, 303; 277/602, 607, 627, 616, 608

(56) References Cited

U.S. PATENT DOCUMENTS 2,405,751 A * 8/1946 McMenamin ............. 99/310 X
2,845,018 A * 7/1958 Turke, Sr. ................ 99/308 X

* cited by examiner

Primary Examiner—Reginald L. Alexander
(74) Attorney, Agent, or Firm—Nath & Associates PLLC; Gary M. Nath; Marvin C. Berkowitz

(57) ABSTRACT

According to this invention, this objective is met by a gasket (1) which is made from a soft plastic and has a central sleeve (8), the diameter of which is tightly fitted to the ascension pipe (5), as well as an outer, bell-shaped flange (9) with a shoulder (7), a skirt (10), a bead (11), and a flat part (12) linking the shoulder (7) of the bell-shaped flange (9) with the central sleeve (8), and where the bead (11) has been manufactured with internal fastening devices (3b), which have been designed to hook into corresponding fastening devices (3a) on the funnel (2), fastening the gasket (1) on the funnel (2), where the shoulder (7) of the bell-shaped flange (9) has a diameter greater than that of the skirt (10) of the bell-shaped flange (9), but smaller than the diameter of the bead (11).

9 Claims, 2 Drawing Sheets

GASKET FOR A FUNNEL FOR A COFFEE MAKING APPARATUS

TECHNICAL FIELD OF THE INVENTION

This invention relates to a gasket for a funnel for a coffee-making apparatus of the type designed to have water brought to a boil in a closed container, whereupon the water is pressed through an ascension pipe into a funnel, where boiling water extracts aromas and flavour from the ground coffee, whereupon the finished coffee beverage is filtered back into the closed container through a filter placed at the outlet of the funnel.

BACKGROUND OF THE INVENTION

Such a gasket for a coffee-making apparatus is known from the Danish Patent Nos. DK 90776 and DK 98310, where the gasket is placed on the central pipe as a wedge-shaped funnel and is squeezed into the opening of the closed container of the coffee-making apparatus, which thus assisted in maintaining both an overpressure in the closed container during boiling and a partial vacuum in the closed container during the return stage of the finished coffee.

However, this coffee-making method involves a series of drawbacks, as a hazardously great overpressure might build during boiling; such an overpressure could entail an explosive destruction of the closed container and pose a considerable risk to persons present. It should be added that the gasket described in DK 98310 was fitted with a peripheral threadlike slot, which could to some extent ensure a reduction in overpressure in the closed container.

TECHNICAL PROBLEM

Consequently, the basis for this invention is the object of providing a gasket for the funnel of a coffee-making apparatus of the type mentioned in the introduction, where the gasket is deformed appropriately at differences of pressure greater than a few hundred millimeters of water column with a view to limiting or levelling the difference of pressure. Moreover, the gasket must be easily dismantled with a view to cleaning or replacement, and it must be able to withstand the temperatures and chemical conditions arising during the preparation of coffee.

THE SOLUTION

According to this invention, this objective is met by means of a gasket for a coffee-making apparatus of the type initially mentioned, where the gasket is made of a type of plastic and has a central sleeve, the diameter of which is tightly fitted for mounting on the ascension pipe, as well as an outer flange, which is bell-shaped and manufactured with a shoulder, a skirt, a bead, and a flat, membrane-like part linking the shoulder of the bell-shaped flange with the central sleeve; where the bead has been manufactured with internal fastening devices, which have been designed to hook into corresponding fastening devices on the funnel, fastening the gasket on it; and where the shoulder of the bell-shaped flange has a diameter greater than that of the skirt of the bell-shaped flange, but smaller than that of the bead.

In an appropriate embodiment of the gasket, the plastic used will primarily be EPDM, which offers optimum properties for this use, insofar as this material is heat resistant, resistant to the acids present in coffee, and to the relevant temperatures, which will depend on the steam pressure. Moreover, the material softens as the temperature rises, a fact which promotes deformation of the gasket. The material also displays advantageous aging properties, and thus the material is, taken as a whole, ideal for use in connection with vacuum and pressure-proof joints under the given conditions. Moreover, it is propitious that the gasket is suitable for dishwashers. The plastic may also be silicone rubber or similar materials.

The present invention facilitates an airtight and steam-tight joint between the funnel and the opening of the closed container, so that it is possible to induce differences in pressure between the inside of the closed container and the surrounding environment. In the event of unintentional pressure rises inside the closed container, such pressure will mainly affect the flat part of the gasket, causing an axial displacement of the gasket, thus reducing the diameter of the shoulder correspondingly. This will ease the release of the funnel, causing the pressure to become equalised.

In the event of unintentional rises in vacuum inside the closed container, the flat part of the gasket will also be affected axially, although in the opposite direction, thus once again reducing the diameter of the shoulder correspondingly. This will ease the release of the funnel, so that an equalization of the pressure can be made. However, this time the pressure gradient has the opposite direction, and it may be difficult to release the funnel. As a consequence, it is suggested that the pot which constitutes the closed container should have a raised edge outside the opening, making it possible to tilt the funnel around this edge with a view to releasing it from the pot.

With a view to preventing the gasket from collapsing, it is supported axially on the inside by a funnel adapter, which runs concentric with the ascension pipe from the fastening devices on the funnel. In order to ease the reduction of the diameter of the gasket at great differences of pressure, the diameter of the gasket on the inside of the shoulder is greater than the diameter of the funnel adapter at this position. This ensures enough space for the shoulder to move radially as a result of pressure affecting the gasket.

It would be convenient for the fastening devices of the gasket and the funnel to consist of a slot on the gasket and a bead on the funnel with a sectional profile corresponding to that of the slot. Such fastening devices are uncomplicated, and hence financially advantageous, in terms of production. It would also be possible to design the fastening devices as either bayonet sockets or as internal and external threads. However, this would complicate handling of the gasket and would not reduce production costs.

Further appropriate designs of the invention appear from the dependent claims.

BRIEF DESCRIPTION OF THE DRAWINGS

An example of an embodiment of the present invention is set out in the drawing. In this drawing.

DESCRIPTION OF A GIVEN EMBODIMENT

Figure 1:
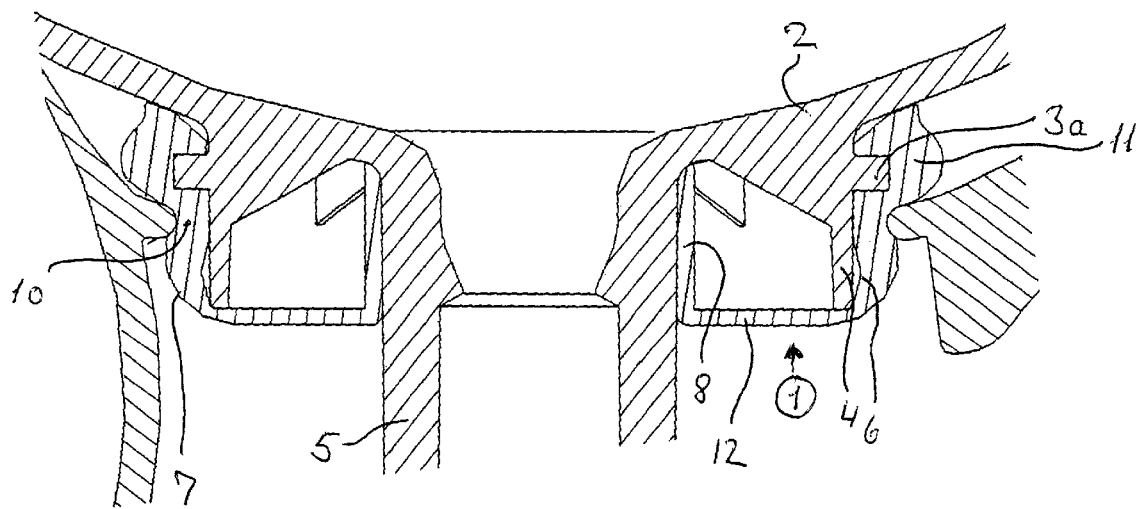
FIG. 1 is a detailed depiction of the gasket according to the present invention placed on a funnel.

In FIG. 1, the gasket 1 according to the present invention is depicted positioned on the funnel 2 of a coffee-making apparatus of the type initially indicated. The gasket 1 according to the embodiment is made from EPDM, which has proven to possess the most advantageous properties for the intended use. The gasket 1 is here shown attached to the funnel 2 by means of a bead 3a, and it will appear that the gasket 1 is supported axially on the inside by a funnel adapter 4, which runs concentric with the ascension pipe 5 from the fastening devices 3a on the funnel 2. The objective of the funnel adapter 4 is to prevent the gasket 1 from collapsing, so that said gasket 1 does not simply fold up at great overpressure; rather, the funnel adapter 4 ensures a radial reduction of the gasket 1, for example by means of plastic deformation.

In order to ease the reduction of the diameter of the gasket 1 at great differences of pressure, the diameter of the gasket 1 at the inside 6 of the shoulder 7 is greater than the diameter of the funnel adapter 4 at this position. This ensures enough space for the shoulder 7 to move radially as a result of pressure affecting the gasket 1.

Figure 2:
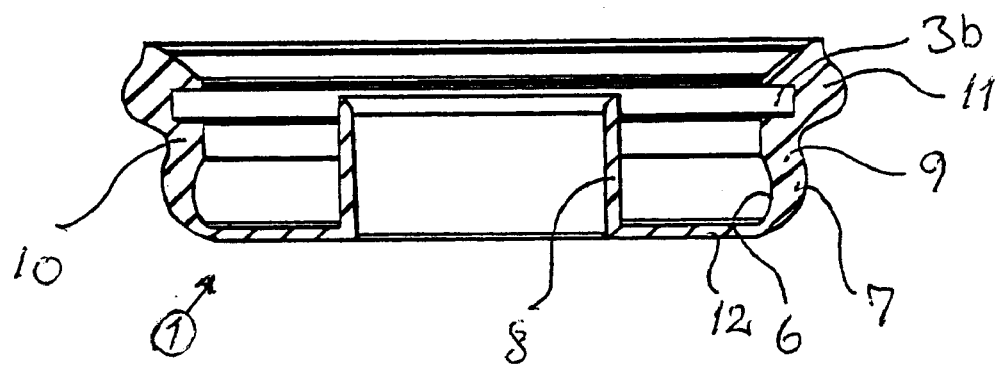
FIG. 2 is an axial cross-sectional view through the gasket according to the present invention.

In FIG. 2, the gasket 1 is depicted in a cross-sectional view, where the individual parts of the gasket 1 can be identified. The gasket 1 has a central sleeve 8, which when mounted fits tightly to the ascension pipe 5, as well as an outer, bell-shaped flange 9 with a shoulder 7, a skirt 10, a bead 11, and a flat, membrane-like part 12 linking the shoulder 7 of the bell-shaped flange 9 with the central sleeve 8. The bead 11 has been manufactured with an internal slot 3b, which has been designed to hook into a corresponding bead 3a on the funnel 2, fastening the gasket 1 on the funnel 2. Moreover, FIG. 2 also shows that the shoulder 7 of the bell-shaped flange 9 has a diameter greater than that of the skirt 10 of the bell-shaped flange 9, and that the diameter of the shoulder 7 is smaller than the diameter of the bead 11.

During normal use of the coffee-making apparatus, the gasket 1 must remain on the funnel 2. However, if it becomes necessary to clean the gasket 1, the bead 11 can be twisted off the bead 3a of the funnel 2 and cleaned, for example in a dishwasher. The gasket 1 can then be refitted on the bead 3a of the funnel 2 and is then again ready for use.

The embodiment shown is an example only and is not limited to what is depicted in the drawings. Changes and variations which are obvious to experts are also included in the scope of this invention.

What is claimed is:

1. A gasket for a funnel for a coffee-making apparatus of the type designed to have water brought to a boil in a closed container, whereupon the water is pressed through an ascension pipe into a funnel, where boiling water extracts aromas and flavour from the ground coffee, whereupon the finished coffee beverage is filtered back into the closed container through a filter placed at the outlet of the funnel, characterised in that the gasket (1) is made from a soft plastic and has a central sleeve (8), the diameter of which is tightly fitted to the ascension pipe (5), as well as an outer, bell-shaped flange (9) with a shoulder (7), a skirt (10), a bead (11), and a flat part (12) linking the shoulder (7) of the bell-shaped flange (9) with the central sleeve (8), and where the bead (11) has been manufactured with internal fastening devices 3b, which have been designed to hook into corresponding fastening devices (3a) on the funnel (2), fastening the gasket (1) on the funnel (2), where the shoulder (7) of the bell-shaped flange (9) has a diameter greater than that of the skirt (10) of the bell-shaped flange (9), but smaller than the diameter of the bead (11).

2. Gasket according to claim 1, characterised in that the plastic is EPDM.

3. Gasket according to claim 1, characterised in that the gasket is supported internally by a funnel adapter (4) which runs concentric with the ascension pipe (5) from the fastening devices (3a) on the funnel (2).

4. Gasket according to claim 1, characterised in that the fastening devices (3b) on the gasket (1) and the funnel (2) consist of a slot (3b) on the gasket (1) and a bead (3a) on the funnel, the bead (3a) has a sectional profile which corresponds to the slot (3b).

5. Gasket according to claim 2, characterised in that the gasket is supported internally by a funnel adapter (4) which runs concentric with the ascension pipe (5) from the fastening devices (3a) on the funnel (2).

6. Gasket according to claim 2, characterised in that the fastening devices (3b) on the gasket (1) and the funnel (2) consist of a slot (3b) on the gasket (1) and a bead (3a) on the funnel, the bead (3a) has a sectional profile which corresponds to the slot (3b).

7. Gasket according to claim 3, characterised in that the fastening devices (3b) on the gasket (1) and the funnel (2) consist of a slot (3b) on the gasket (1) and a bead (3a) on the funnel, the bead (3a) has a sectional profile which corresponds to the slot (3b).

8. Gasket according to claim 4, characterised in that the fastening devices (3b) on the gasket (1) and the funnel (2) consist of a slot (3b) on the gasket (1) and a bead (3a) on the funnel, the bead (3a) has a sectional profile which corresponds to the slot (3b).

9. Gasket according to claim 5, characterised in that the fastening devices (3b) on the gasket (1) and the funnel (2) consist of a slot (3b) on the gasket (1) and a bead (3a) on the funnel, the bead (3a) has a sectional profile which corresponds to the slot (3b).

* * * * *